US011002178B1

(12) United States Patent
Zhang

(10) Patent No.: US 11,002,178 B1
(45) Date of Patent: May 11, 2021

(54) METHODS AND SYSTEMS FOR A PRE-CHAMBER

(71) Applicant: Ford Global Technologies, LLC, Dearborn, MI (US)

(72) Inventor: Xiaogang Zhang, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/748,570

(22) Filed: Jan. 21, 2020

(51) Int. Cl.
*F02B 19/18* (2006.01)
*F02B 19/10* (2006.01)

(52) U.S. Cl.
CPC .......... *F02B 19/18* (2013.01); *F02B 19/1014* (2013.01); *F02B 19/1066* (2013.01)

(58) Field of Classification Search
CPC ... F02B 19/18; F02B 19/1014; F02B 19/1066
See application file for complete search history.

(56) References Cited

U.S. PATENT DOCUMENTS

| 4,250,852 | A  | * | 2/1981 | Abulkasim ogly Kerimov ........ F02B 19/108 123/260 |
|---|---|---|---|---|
| 8,839,762 | B1 | * | 9/2014 | Chiera ................ F02B 19/1095 123/256 |
| 8,925,518 | B1 |   | 1/2015 | Riley et al. |
| 9,353,674 | B2 |   | 5/2016 | Bunce et al. |
| 10,018,104 | B2 |   | 7/2018 | Grover, Jr. et al. |
| 10,208,652 | B2 | * | 2/2019 | Maier ................. F02B 19/1019 |
| 10,378,428 | B2 | * | 8/2019 | Muto ...................... F02B 19/12 |
| 2009/0025670 | A1 | * | 1/2009 | Filipek .................... F02P 15/06 123/169 R |
| 2012/0103302 | A1 |   | 5/2012 | Attard |
| 2013/0233273 | A1 | * | 9/2013 | Redtenbacher ..... F02B 19/1014 123/253 |
| 2014/0261296 | A1 | * | 9/2014 | Sotiropoulou ...... F02B 19/1014 123/260 |
| 2014/0261298 | A1 | * | 9/2014 | Sasidharan ......... F02B 19/1014 123/275 |
| 2015/0040845 | A1 | * | 2/2015 | Chiera .................... F02B 19/18 123/41.32 |
| 2016/0025057 | A1 | * | 1/2016 | Kato ................... F02M 61/1886 239/584 |
| 2016/0053671 | A1 | * | 2/2016 | Sotiropoulou .......... F02B 19/08 123/260 |
| 2016/0061095 | A1 | * | 3/2016 | Loetz .................. F02B 19/1057 123/260 |
| 2016/0160741 | A1 | * | 6/2016 | Gu ...................... F02B 19/1004 123/275 |
| 2017/0096932 | A1 | * | 4/2017 | Chiera .................... F02P 13/00 |
| 2017/0122184 | A1 | * | 5/2017 | Hampson ................ F02B 19/12 |
| 2017/0167358 | A1 | * | 6/2017 | Maier ..................... F02B 19/18 |
| 2017/0167359 | A1 | * | 6/2017 | Maier ..................... F02B 19/18 |
| 2017/0241325 | A1 | * | 8/2017 | Gu ......................... F02M 43/04 |
| 2017/0350308 | A1 | * | 12/2017 | Polonowski ............ F02B 19/18 |

* cited by examiner

*Primary Examiner* — Xiao En Mo
(74) *Attorney, Agent, or Firm* — Geoffrey Brumbaugh; McCoy Russell LLP

(57) ABSTRACT

Methods and systems are provided for a pre-chamber. In one example, a pre-chamber comprises a plurality of venturi passages fluidly coupling it to a primary combustion chamber. The plurality of venturi passages may be configured to assist in drawing out residual gases from a previous combustion event during a current combustion event.

20 Claims, 6 Drawing Sheets

METHODS AND SYSTEMS FOR A PRE-CHAMBER

FIELD

The present description relates generally to a pre-chamber and method for operation of such a system.

BACKGROUND/SUMMARY

Engines have in the past utilized pre-chamber combustion to increase combustion efficiency and correspondingly reduce emissions. Pre-chamber combustion systems typically include an auxiliary pre-chamber above the main combustion chamber with an ignition device and fuel injector coupled to the auxiliary pre-chamber. In such systems, combustion unfolds in the following sequence; (i) a small amount of fuel is directly injected into the pre-chamber, (ii) spark is provided to the air/fuel mixture in the pre-chamber; and (iii) the hot gas jets into the main combustion chamber to ignite the charge disposed therein. Jetting the ignited gas into the main combustion chamber in this manner enables hot gas jets to penetrate deeper into the main combustion chamber, causing more evenly distributed ignition, when compared to engines that do not employ pre-chamber schemes.

One example approach shown by Attard in U.S. 2012/0103302 includes a system with an ignition assembly with a pre-chamber, a fuel injector, and a spark plug that is mounted in the cylinder head above the main combustion chamber. Attard's pre-chamber ignition system achieves fast burn in fuel-lean conditions. However, the inventors have recognized several potential drawbacks with Attard's system and other pre-chamber assemblies. For instance, residual burned gases may dwell in the pre-chamber, diluting the air/fuel mixture in subsequent combustion cycles. As a result, combustion efficiency is decreased and emissions are associatively increased. Moreover, the supplemental fuel injected into the pre-chamber may not enhance ignitibility or burn rate during stoichiometric conditions. Therefore, Attard's system may only achieve efficiency gains during a limited window of engine operation.

However, the inventors have identified the above described issues and come up with a way to at least partially solve them. In one example, the issues described above may be addressed by a pre-chamber configured to eject a mixture to a primary combustion chamber via a plurality of venturi passages. In this way, a fuel injection and a venturi throat may be used in combination to expel residual gas out of the pre-chamber without an extra pump and corresponding air passage.

As one example, a fuel injector tip is inserted into a top half volume shaped by a pre-chamber wall. A plurality of side air paths is arranged above the plurality of outlets between a cylinder head and the plurality of outlets. A spark plug extends into a bottom half volume of the pre-chamber. By configuring the pre-chamber in this way, the residual gas may exit the pre-chamber via the plurality of outlets and air may be supplied to the top half volume via the plurality of side air paths. In this way, efficient combustion may be realized without use of auxiliary devices such as a pump or a valve.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
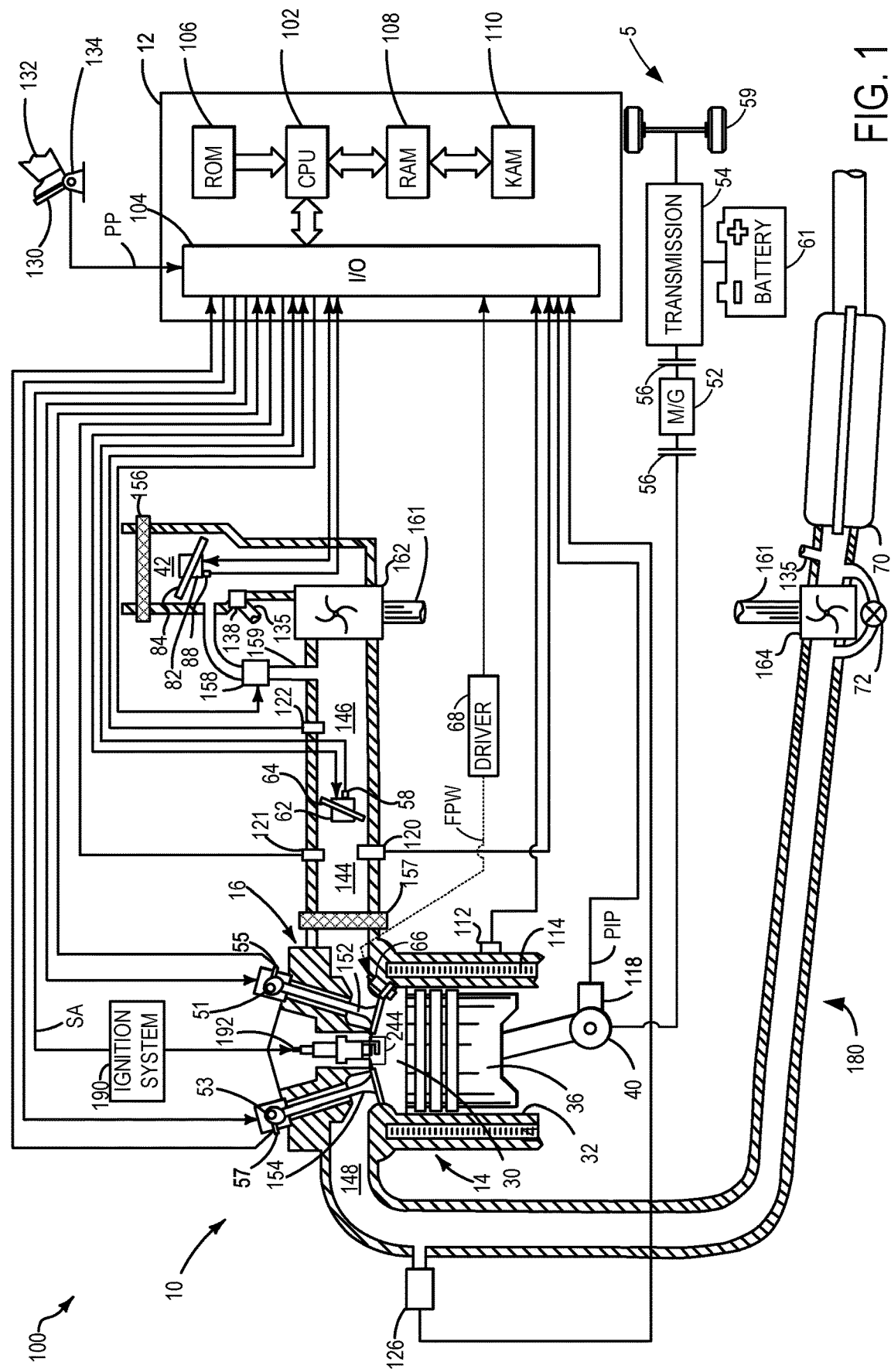
FIG. 1 illustrates an engine of a hybrid vehicle.
Figure 2:
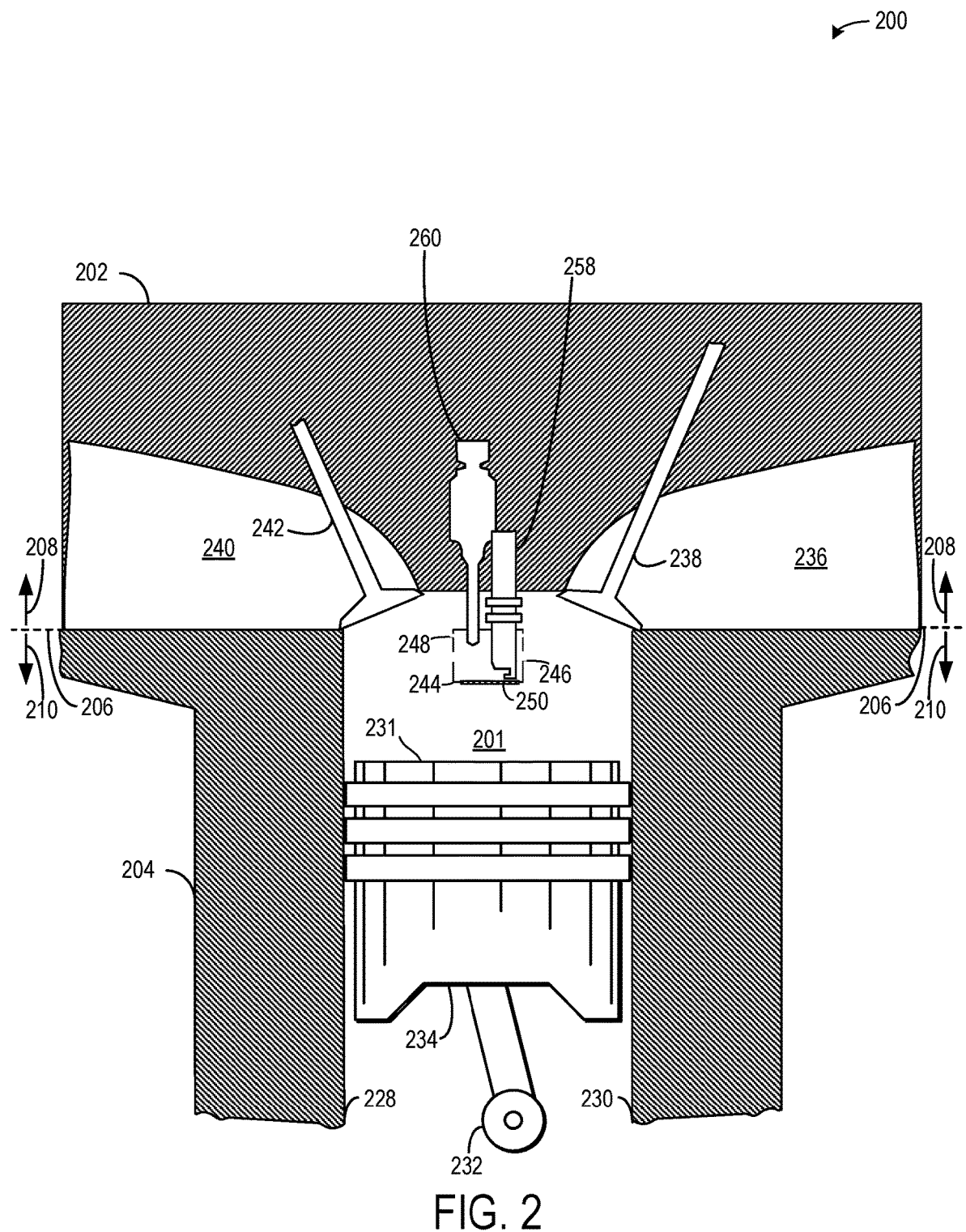
FIG. 2 illustrates a pre-chamber of the engine, the pre-chamber configured to direct a hot air/fuel mixture into a primary combustion chamber.

The following description relates to systems and methods for a pre-chamber of a primary combustion chamber. The primary combustion chamber comprises a piston configured to oscillate therein, as illustrated in FIG. 1. The pre-chamber is arranged within or above a volume of the primary combustion chamber, wherein the pre-chamber comprises walls for separating a pre-chamber volume from the primary combustion chamber volume, as shown in FIG. 2. The pre-chamber comprises a plurality of outlets comprising a venturi shape, as shown in FIGS. 3A, 3B, 4A, 4B, and 5. Herein, the plurality of outlets may be interchangeably referred to as a plurality of venturi passages. The venturi shape may promote residual gases stored in the pre-chamber to exit during a fuel injection from a fuel injector positioned to inject directly into the pre-chamber volume. As the fuel injection and residual gases exit the pre-chamber, intake air may enter the pre-chamber through a plurality of side air paths. A method for timing the fuel injection and flowing residual gases out of the pre-chamber and intake air into the pre-chamber is illustrated in FIG. 6.

In the embodiments below of the pre-chamber, features may be introduced to assist in the expulsion of residual gases from a volume of the pre-chamber to a volume of the primary combustion chamber during a current combustion event. Herein, residual gases refer to gases from a previous combustion cycle that were not expelled and may be held within the pre-chamber. As such, the residual gases may include air, exhaust gas, unburned hydrocarbons, and combustion byproducts. Furthermore, a combustion cycle includes an intake stroke, a compression stroke, an expansion stroke, and an exhaust stroke. A current combustion cycle ends and a next combustion cycle begins on a transition of a piston from the exhaust stroke to an intake stroke.

FIG. 1 depicts an engine system 100 for a vehicle. The vehicle may be an on-road vehicle having drive wheels which contact a road surface. Engine system 100 includes engine 10 which comprises a plurality of cylinders. FIG. 1 describes one such cylinder or combustion chamber in detail. The various components of engine 10 may be controlled by electronic engine controller 12.

Engine 10 includes a cylinder block 14 including at least one cylinder bore, and a cylinder head 16 including intake valves 152 and exhaust valves 154. In other examples, the cylinder head 16 may include one or more intake ports and/or exhaust ports in examples where the engine 10 is configured as a two-stroke engine. The cylinder block 14 includes cylinder walls 32 with piston 36 positioned therein and connected to crankshaft 40. Thus, when coupled together, the cylinder head 16 and cylinder block 14 may form one or more combustion chambers. As such, the combustion chamber 30 volume is adjusted based on an oscillation of the piston 36. Combustion chamber 30 may also be referred to herein as cylinder 30. The combustion chamber 30 is shown communicating with intake manifold 144 and exhaust manifold 148 via respective intake valves 152 and exhaust valves 154. Each intake and exhaust valve may be operated by an intake cam 51 and an exhaust cam 53. Alternatively, one or more of the intake and exhaust valves may be operated by an electromechanically controlled valve coil and armature assembly. The position of intake cam 51 may be determined by intake cam sensor 55. The position of exhaust cam 53 may be determined by exhaust cam sensor 57. Thus, when the valves 152 and 154 are closed, the combustion chamber 30 and cylinder bore may be fluidly sealed, such that gases may not enter or leave the combustion chamber 30.

Combustion chamber 30 may be formed by the cylinder walls 32 of cylinder block 14, piston 36, and cylinder head 16. Cylinder block 14 may include the cylinder walls 32, piston 36, crankshaft 40, etc. Cylinder head 16 may include one or more fuel injectors such as fuel injector 66, one or more intake valves 152, and one or more exhaust valves such as exhaust valves 154. The cylinder head 16 may be coupled to the cylinder block 14 via fasteners, such as bolts and/or screws. In particular, when coupled, the cylinder block 14 and cylinder head 16 may be in sealing contact with one another via a gasket, and as such the cylinder block 14 and cylinder head 16 may seal the combustion chamber 30, such that gases may only flow into and/or out of the combustion chamber 30 via intake manifold 144 when intake valves 152 are opened, and/or via exhaust manifold 148 when exhaust valves 154 are opened. In some examples, only one intake valve and one exhaust valve may be included for each combustion chamber 30. However, in other examples, more than one intake valve and/or more than one exhaust valve may be included in each combustion chamber 30 of engine 10.

In some examples, each cylinder of engine 10 may include a spark plug 192 for initiating combustion. Ignition system 190 can provide an ignition spark to cylinder 14 via spark plug 192 in response to spark advance signal SA from controller 12, under select operating modes. However, in some embodiments, spark plug 192 may be omitted, such as where engine 10 may initiate combustion by auto-ignition or by injection of fuel as may be the case with some diesel engines.

Fuel injector 66 may be positioned to inject fuel directly into combustion chamber 30, which is known to those skilled in the art as direct injection. Fuel injector 66 delivers liquid fuel in proportion to the pulse width of signal FPW from controller 12. Fuel is delivered to fuel injector 66 by a fuel system (not shown) including a fuel tank, fuel pump, and fuel rail. Fuel injector 66 is supplied operating current from driver 68 which responds to controller 12. In some examples, the engine 10 may be a gasoline engine, and the fuel tank may include gasoline, which may be injected by injector 66 into the combustion chamber 30. However, in other examples, the engine 10 may be a diesel engine, and the fuel tank may include diesel fuel, which may be injected by injector 66 into the combustion chamber. Further, in such examples where the engine 10 is configured as a diesel engine, the engine 10 may include a glow plug to initiate combustion in the combustion chamber 30.

In one example, the combustion chamber 30 is a primary combustion chamber further comprising a pre-chamber 244. The spark plug 192 may be arranged to ignite an air/fuel mixture arranged within only the pre-chamber. FIG. 2 illustrates the primary combustion chamber and the pre-chamber in greater detail. While the fuel injector 66 is illustrated as a side-wall fuel injector, it will be appreciated that the fuel injector 66 may be positioned to inject into a volume of the pre-chamber 244. Such an example is illustrated in FIG. 2.

Intake manifold 144 is shown communicating with throttle 62 which adjusts a position of throttle plate 64 to control airflow to engine cylinder 30. This may include controlling airflow of boosted air from intake boost chamber 146. In some embodiments, throttle 62 may be omitted and airflow to the engine may be controlled via a single air intake system throttle (AIS throttle) 82 coupled to air intake passage 42 and located upstream of the intake boost chamber 146. In yet further examples, AIS throttle 82 may be omitted and airflow to the engine may be controlled with the throttle 62.

In some embodiments, engine 10 is configured to provide exhaust gas recirculation, or EGR. When included, EGR may be provided as high-pressure EGR and/or low-pressure EGR. In examples where the engine 10 includes low-pressure EGR, the low-pressure EGR may be provided via EGR passage 135 and EGR valve 138 to the engine air intake system at a position downstream of air intake system (AIS) throttle 82 and upstream of compressor 162 from a location in the exhaust system downstream of turbine 164. EGR may be drawn from the exhaust system to the intake air system when there is a pressure differential to drive the flow. A pressure differential can be created by partially closing AIS throttle 82. Throttle plate 84 controls pressure at the inlet to compressor 162. The AIS may be electrically controlled and its position may be adjusted based on optional position sensor 88.

Ambient air is drawn into combustion chamber 30 via intake passage 42, which includes air filter 156. Thus, air first enters the intake passage 42 through air filter 156. Compressor 162 then draws air from air intake passage 42 to supply boost chamber 146 with compressed air via a compressor outlet tube (not shown in FIG. 1). In some examples, air intake passage 42 may include an air box (not shown) with a filter. In one example, compressor 162 may be a turbocharger, where power to the compressor 162 is drawn from the flow of exhaust gases through turbine 164. Specifically, exhaust gases may spin turbine 164 which is coupled to compressor 162 via shaft 161. A wastegate 72 allows exhaust gases to bypass turbine 164 so that boost pressure can be controlled under varying operating conditions. Wastegate 72 may be closed (or an opening of the wastegate may be decreased) in response to increased boost demand, such as during an operator pedal tip-in. By closing the wastegate, exhaust pressures upstream of the turbine can be increased, raising turbine speed and peak power output. This allows boost pressure to be raised. Additionally, the wastegate can be moved toward the closed position to maintain desired boost pressure when the compressor recirculation valve is partially open. In another example, wastegate 72 may be opened (or an opening of the wastegate may be increased) in response to decreased boost demand, such as during an operator pedal tip-out. By opening the wastegate, exhaust pressures can be reduced, reducing turbine speed and turbine power. This allows boost pressure to be lowered.

However, in alternate embodiments, the compressor 162 may be a supercharger, where power to the compressor 162 is drawn from the crankshaft 40. Thus, the compressor 162 may be coupled to the crankshaft 40 via a mechanical linkage such as a belt. As such, a portion of the rotational energy output by the crankshaft 40, may be transferred to the compressor 162 for powering the compressor 162.

Compressor recirculation valve 158 (CRV) may be provided in a compressor recirculation path 159 around compressor 162 so that air may move from the compressor outlet to the compressor inlet so as to reduce a pressure that may develop across compressor 162. A charge air cooler 157 may be positioned in boost chamber 146, downstream of compressor 162, for cooling the boosted aircharge delivered to the engine intake. However, in other examples as shown in FIG. 1, the charge air cooler 157 may be positioned downstream of the electronic throttle 62 in an intake manifold 144. In some examples, the charge air cooler 157 may be an air to air charge air cooler. However, in other examples, the charge air cooler 157 may be a liquid to air cooler.

In the depicted example, compressor recirculation path 159 is configured to recirculate cooled compressed air from upstream of charge air cooler 157 to the compressor inlet. In alternate examples, compressor recirculation path 159 may be configured to recirculate compressed air from downstream of the compressor and downstream of charge air cooler 157 to the compressor inlet. CRV 158 may be opened and closed via an electric signal from controller 12. CRV 158 may be configured as a three-state valve having a default semi-open position from which it can be moved to a fully-open position or a fully-closed position.

Universal Exhaust Gas Oxygen (UEGO) sensor 126 is shown coupled to exhaust manifold 148 upstream of emission control device 70. Alternatively, a two-state exhaust gas oxygen sensor may be substituted for UEGO sensor 126. Emission control device 70 may include multiple catalyst bricks, in one example. In another example, multiple emission control devices, each with multiple bricks, can be used. While the depicted example shows UEGO sensor 126 upstream of turbine 164, it will be appreciated that in alternate embodiments, UEGO sensor may be positioned in the exhaust manifold downstream of turbine 164 and upstream of emission control device 70. Additionally or alternatively, the emission control device 70 may comprise a diesel oxidation catalyst (DOC) and/or a diesel cold-start catalyst, a particulate filter, a three-way catalyst, a $NO_x$ trap, selective catalytic reduction device, and combinations thereof. In some examples, a sensor may be arranged upstream or downstream of the emission control device 70, wherein the sensor may be configured to diagnose a condition of the emission control device 70.

Controller 12 is shown in FIG. 1 as a microcomputer including: microprocessor unit 102, input/output ports 104, read-only memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an input device 130 for sensing input device pedal position (PP) adjusted by a vehicle operator 132; a knock sensor for determining ignition of end gases (not shown); a measurement of engine manifold pressure (MAP) from pressure sensor 121 coupled to intake manifold 144; a measurement of boost pressure from pressure sensor 122 coupled to boost chamber 146; an engine position sensor from a Hall effect sensor 118 sensing crankshaft 40 position; a measurement of air mass entering the engine from sensor 120 (e.g., a hot wire air flow meter); and a measurement of throttle position from sensor 58. Barometric pressure may also be sensed (sensor not shown) for processing by controller 12. In a preferred aspect of the present description, Hall effect sensor 118 produces a predetermined number of equally spaced pulses every revolution of the crankshaft from which engine speed (RPM) can be determined. The input device 130 may comprise an accelerator pedal and/or a brake pedal. As such, output from the position sensor 134 may be used to determine the position of the accelerator pedal and/or brake pedal of the input device 130, and therefore determine a desired engine torque. Thus, a desired engine torque as requested by the vehicle operator 132 may be estimated based on the pedal position of the input device 130.

In some examples, vehicle 5 may be a hybrid vehicle with multiple sources of torque available to one or more vehicle wheels 59. In other examples, vehicle 5 is a conventional vehicle with only an engine, or an electric vehicle with only electric machine(s). In the example shown, vehicle 5 includes engine 10 and an electric machine 52. Electric machine 52 may be a motor or a motor/generator. Crankshaft 40 of engine 10 and electric machine 52 are connected via a transmission 54 to vehicle wheels 59 when one or more clutches 56 are engaged. In the depicted example, a first clutch 56 is provided between crankshaft 40 and electric machine 52, and a second clutch 56 is provided between electric machine 52 and transmission 54. Controller 12 may send a signal to an actuator of each clutch 56 to engage or disengage the clutch, so as to connect or disconnect crankshaft 40 from electric machine 52 and the components connected thereto, and/or connect or disconnect electric machine 52 from transmission 54 and the components connected thereto. Transmission 54 may be a gearbox, a planetary gear system, or another type of transmission. The powertrain may be configured in various manners including as a parallel, a series, or a series-parallel hybrid vehicle.

Electric machine 52 receives electrical power from a traction battery 61 to provide torque to vehicle wheels 59. Electric machine 52 may also be operated as a generator to provide electrical power to charge battery 61, for example during a braking operation.

The controller 12 receives signals from the various sensors of FIG. 1 and employs the various actuators of FIG. 1 to adjust engine operation based on the received signals and instructions stored on a memory of the controller. For example, coolant flow to the primary combustion chamber 30 and to a pre-chamber described below with respect to FIG. 2 may be adjusted based on feedback from at least a temperature sensor of the pre-chamber and/or its coolant circuit.

Turning now to FIG. 2, it shows an example of a single cylinder of an engine 200. In one example, the engine 200 may be a non-limiting example of the engine 10 of FIG. 1. As such, the engine 200 may be included within the embodiment of a hybrid vehicle, such as vehicle 5 of FIG. 1.

The engine 200 comprises a primary combustion chamber 201. The primary combustion chamber 201 may be a non-limiting example of the combustion chamber 30 of FIG. 1. The primary combustion chamber 201 may be defined via a cylinder head 202, a first interior cylinder wall 228, a second interior cylinder wall 230, and a piston surface 231. It will be appreciated that the first interior cylinder wall 228 and the second interior cylinder wall 230 may be a single, continuous wall. However, in the example of FIG. 2, the cross-section divides the walls into two pieces. In this way, a primary combustion chamber volume may be defined by a cylinder head 202, the first interior cylinder wall 228, the second interior cylinder wall 230, and the piston surface 231. The primary combustion chamber volume may be adjusted via oscillation of the piston 234.

The piston surface 231 corresponds to an upper surface of the piston 234, wherein the piston 234 may be configured to oscillate within the primary combustion chamber 201 via a crankshaft 232. The crankshaft may rotate as a fuel air mixture within the primary combustion chamber 201 combusts and presses against the piston surface 231 and pushes the piston 234 downward. This action may result in motion of the vehicle.

To enhance combustion properties, such as combustion distribution, a pre-chamber 244 is fluidly coupled to the primary combustion chamber 201 via a plurality of passages including a plurality of outlet passages 246, a plurality of air paths 248, and a wire mesh 250. The pre-chamber 244 comprises a fuel injector 260 and an ignition device 258. In one example, the ignition device 258 is a spark plug and the fuel injector 260 is configured to inject gasoline. Additionally or alternatively, the ignition device 258 may be a glow plug and the fuel injector 260 may be configured to inject diesel. In some examples, additionally or alternatively, the fuel injector 260 may be configured to inject a mixture of fuels including alcohols. The fuel injector 260 and the ignition device 258 may be flush with one another or directly adjacent one another to decrease a packaging size.

In one example, the fuel injector 260 is the only fuel injector of the pre-chamber 244 and the primary combustion chamber 201. As such, the fuel injector 260 may be configured to provide an entire desired fuel injection volume. In one example, the fuel injector 260 is configured to inject a plurality of injections at various positions of the piston 231 to increase air flow to the pre-chamber, increase expulsion of residual gases from the pre-chamber, and increase combustion distribution. As such, the primary combustion chamber 201 may be free of a different fuel injector such that a fuel injection is not directly injected into a volume of the primary combustion chamber.

The primary combustion chamber 201 may receive air flow from an air intake passage 236 when an intake valve 238 is in an open position. The pre-chamber 244 may receive air from the primary combustion chamber 201 via one or more of the plurality of air paths 248 and the wire mesh 250. The primary combustion chamber 201 may be fluidly coupled to an exhaust passage 240 when an exhaust valve 242 is in an open position. Exhaust gases along with other combustion artifacts (e.g., air, unburned fuel, etc.) may be expelled to the exhaust passage 240 from the primary combustion chamber 201. When the intake valve 238 and the exhaust valve 242 are in closed positions, such as the positions illustrated, the primary combustion chamber 201, and the pre-chamber 244 may be fluidly sealed from the intake passage 236 and the exhaust passage 240.

In this way, the primary combustion chamber 201 is a separate volume of space relative to the pre-chamber 244, wherein a volume of the primary combustion chamber 201 is greater than a volume of the pre-chamber 244. The pre-chamber 244 may receive intake gases from the primary combustion chamber 201 and release an at least partially ignited fuel/air mixture to the primary combustion chamber 201 to initiate combustion within the primary combustion chamber 201.

As illustrated, the pre-chamber 244 is arranged within a volume of the primary combustion chamber 201. More specifically, dashed line 206 illustrates a divide between the cylinder head 202 and the cylinder block 204. Arrow 208 illustrates a cylinder head side and arrow 210 illustrates a cylinder block side. The fuel injector 260 and the ignition device 258 extend from the cylinder head side and into the volume of the primary combustion chamber on the cylinder block side. The pre-chamber 244 is arranged in a position to receive extreme ends of the fuel injector 260 and the ignition device 258 such that they inject and spark within a volume of the pre-chamber 244. In one example, an entire volume of the pre-chamber 244 is arranged on the cylinder block side of the engine 201. However, the volume of the pre-chamber 244 is fixed and separated from the volume of the primary combustion chamber 201. The plurality of outlets 246, the plurality of air paths 248, and the wire mesh 250 are described in greater detail below. As will also be described below, the wire mesh 250 may be optional and in some embodiments the wire mesh 250 may be omitted and the walls of the pre-chamber 244 may extend in its place.

Figure 3B:
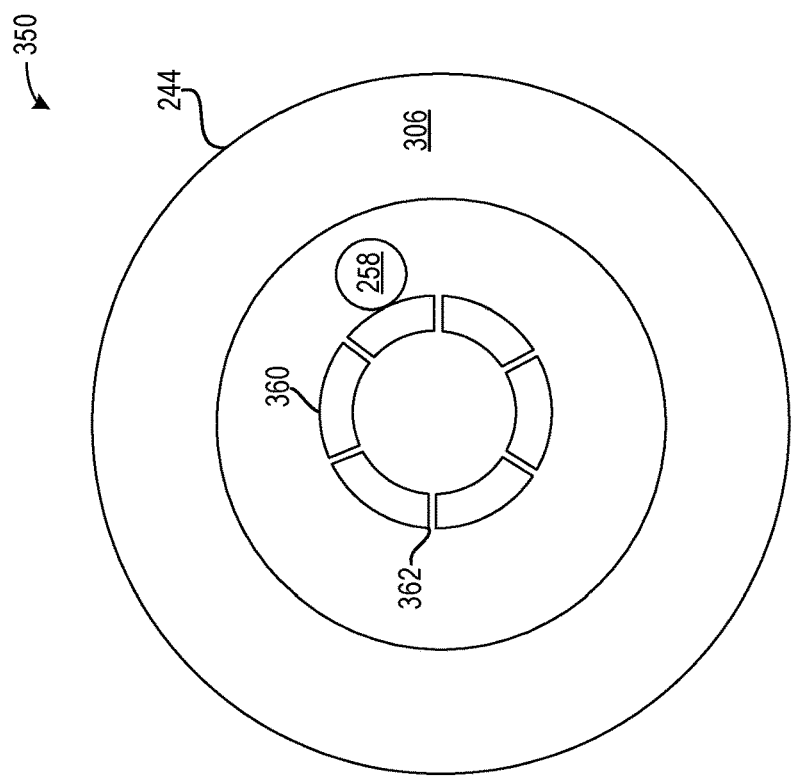
FIGS. 3A and 3B illustrate a first example of the pre-chamber.
Figure 3A:
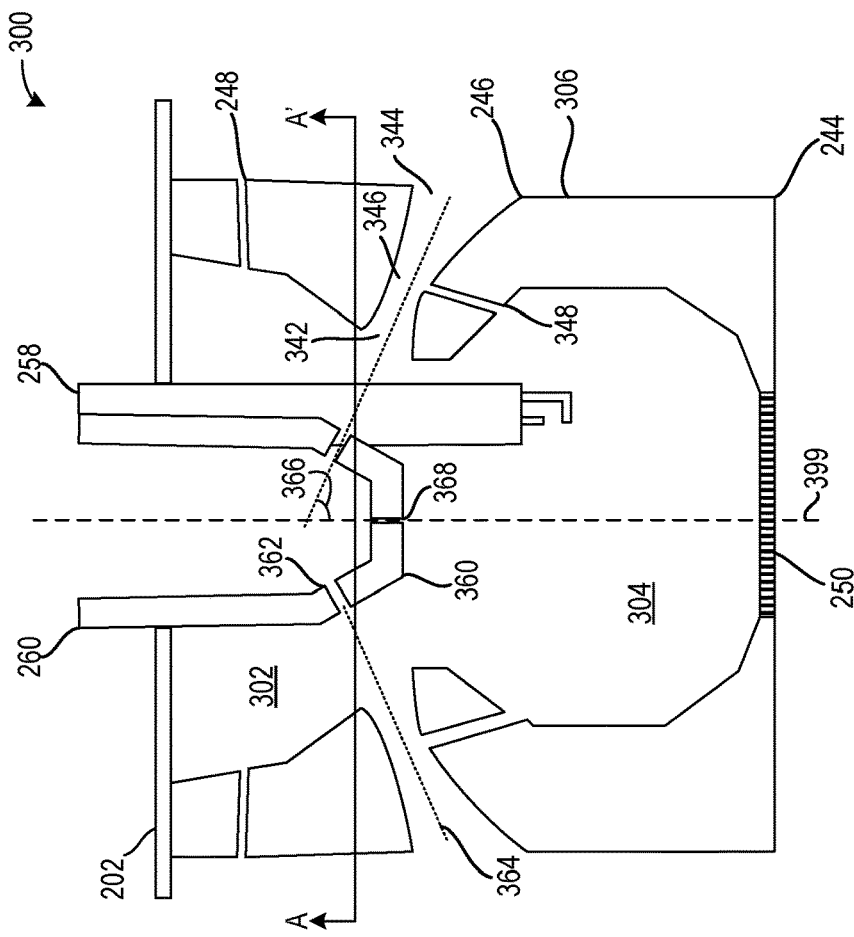

Turning now to FIG. 3A, it shows a first embodiment 300 of the pre-chamber 244 comprising the fuel injector 260 and the ignition device 258. More specifically, a fuel injector tip 360 of the fuel injector 260 is arranged in a top half volume 302 of the pre-chamber 244 and the ignition device 258 is positioned to provide a spark to a bottom half volume 304 of the pre-chamber 244. In one example, the plurality of venturi passages 246 define an imaginary boundary between the top half volume 302 and the bottom half volume 304.

The pre-chamber 244 and the fuel injector tip 360 share a central axis 399. The fuel injector tip 360 comprises a plurality of openings 362 through which fuel may be ejected into the pre-chamber 244. As such, the fuel injector 260 is positioned to inject directly into the pre-chamber 244. A fuel injection may exit each opening of the plurality of openings 362 along an injection axis of a plurality of injection axes 364 toward an associated venturi passage of the plurality of venturi passages 246. The plurality of injection axes 364 are angled relative to the central axis 399 by an angle 366. The angle 366 may be less than 90 degrees in one example. In some examples, additionally or alternatively, the angle 366 is between 5 and 50 degrees, or between 10 and 40 degrees, or between 20 and 30 degrees.

In the example of FIG. 3A, the fuel injector tip 360 comprises a central opening 368 configured to expel a fuel injection with an injection axis parallel to the central axis 399. As such, the fuel injection from the central opening 368 may be directed directly toward the wire mesh 250. In one example, the fuel spray from the central opening 368 directly impinges on the wire mesh 250 and creates a high static pressure in the bottom half volume 302 of the pre-chamber. The static pressure different between neck regions 346 of the plurality of venturi passages 246 and the bottom half volume 304 pushes residual gas into the plurality of venturi passages 246 via a plurality of interior passages 348 and out of the pre-chamber 244.

The central opening 368 may be sized such that a central injection flowing therethrough comprises a sufficient amount of fuel to reach the wire mesh 250. In examples of the pre-chamber where the wire mesh 250 is omitted, the diameter of the central opening 368 may be reduced to decrease an amount of the central injection reaching a pre-chamber surface in the location of the wire mesh 250.

More specifically, each venturi passage of the plurality of venturi passages 246 comprises a venturi inlet 342, a venturi outlet 344, and the venturi throat 346 arranged between the venturi inlet 342 and the venturi outlet 344. A cross-sectional area of the venturi throat 346 may be less than each of the venturi inlet 342 and the venturi outlet 344 such that the venturi throat 346 creates a restriction within the venturi passage 246. Each interior passage of the plurality of interior passage 348 may be shaped within a pre-chamber wall 306 and configured to fluidly couple the bottom half volume 304 to the venturi passage 246 at the venturi throat 346.

In this way, the fuel injections from the plurality of openings 362 may enter the venturi passages 246 at the venturi inlet 342 and flow through the venturi throat 346 and to the venturi outlet 344. While doing this, a low-static pressure may be generated at the venturi throat 346, which in combination with the high-static pressure at the bottom half volume 304 due to the fuel injection from the central opening 368 results in residual gases from a previous combustion cycle trapped in the bottom half volume 304 flowing through the interior passages 348 and into the plurality of venturi passages 246 where the residual gas may participate in combustion in the primary combustion chamber (e.g., primary combustion chamber 201 of FIG. 2).

As illustrated, the fuel injections from the plurality of openings 362 initially enter the top half volume 302 and flow across a gap between the fuel injector tip 360 and the plurality of venturi passages 246 before entering the venturi passages.

As the fuel, air, and residual gas mixture exits the pre-chamber 244 via the plurality of venturi passages 246, intake air may begin to enter pre-chamber 244 via the plurality of air passages 248. In this way, the pre-chamber 244 is supplied with fresh air.

The spark plug 258 is arranged directly adjacent to the fuel injector 260. A position of the spark plug 258 is illustrated in greater detail in FIG. 3B, which illustrates a cross-section 350 taken along cutting plane A-A' of FIG. 3A. As shown, the spark plug 258 is arranged in a position adjacent to the fuel injector 260 and between adjacent openings of the plurality of openings 362. By positioning the ignition device 258 in this way, fuel may be less likely to contact and impinge thereon.

Figure 4B:
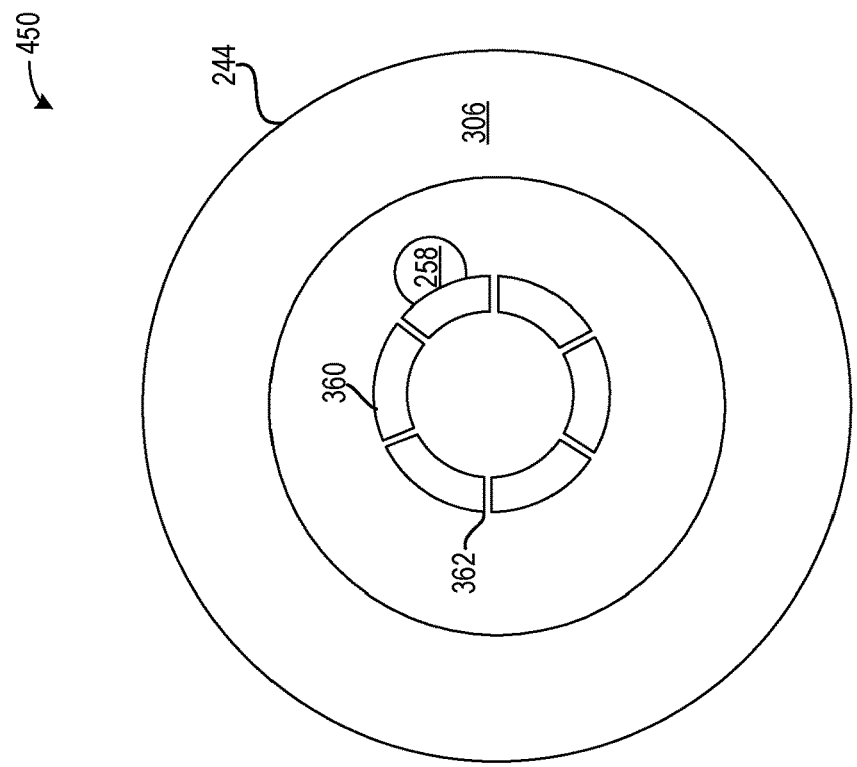
FIGS. 4A and 4B illustrate a second example of the pre-chamber.
Figure 4A:
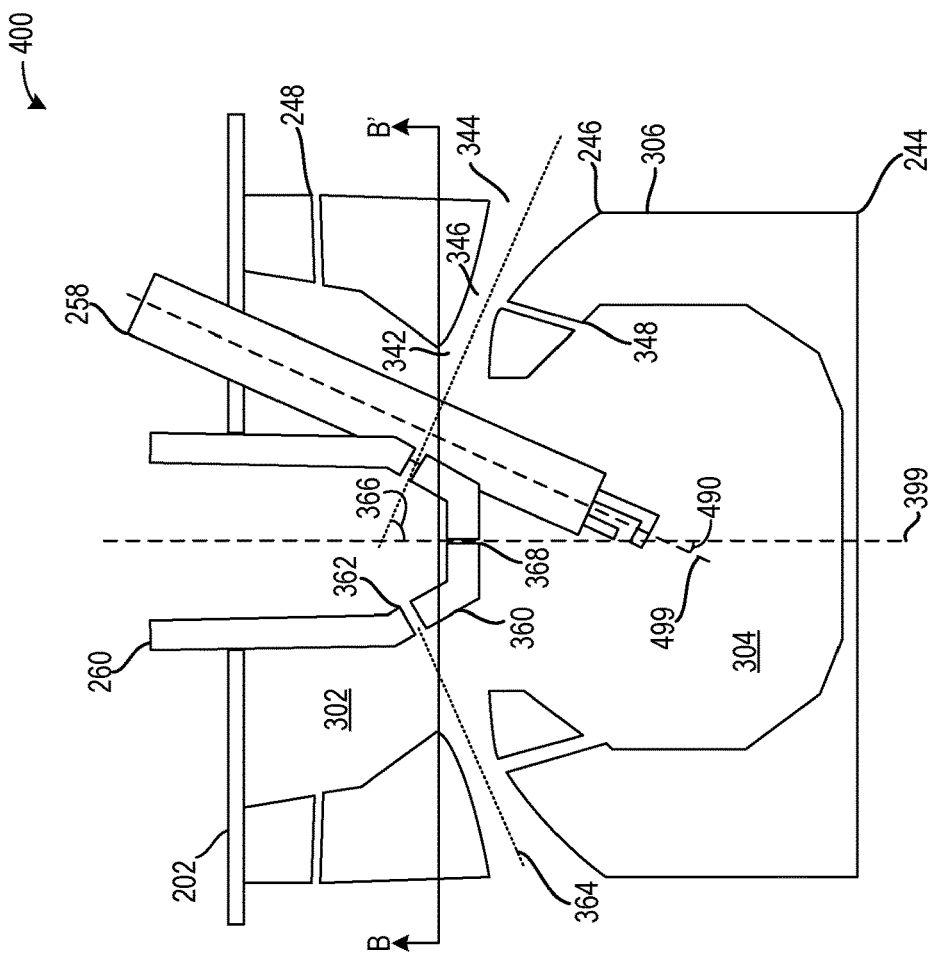

Turning now to FIGS. 4A and 4B, they show a second embodiment 400 of the pre-chamber 244 along with a cross-section 450 of the pre-chamber 244, respectively, wherein the cross-section 450 is taken along cutting plane B-B' of FIG. 4A. The second embodiment 400 differs from the first embodiment 300 of FIG. 3A in that the second embodiment 400 comprises a different orientation of the ignition device 258 along. Furthermore, the second embodiment 400 may be free of the wire mesh 250.

The ignition device 258 may be positioned at an angle 490 measured between the central axis 399 and a central axis 499 of the ignition device 258. The angle 490 may be less than 90 degrees. In some examples, additionally or alternatively, the angle 490 is between 10 and 60 degrees. In some examples, additionally or alternatively, the angle 490 is between 20 and 50 degrees. In some examples, additionally or alternatively, the angle 490 is between 20 and 40 degrees. In one example, the angle 490 is between 20 and 30 degrees. In one example, the angle 490 is the same as the injector tip 362 angle.

As shown in the cross-section 450 of FIG. 4B, the ignition device 258 may still be positioned between adjacent openings of the plurality of openings 362. By arranging the ignition device 258 at the angle 490, the ignition device 258 may more thoroughly ignite a fuel injection from the central opening 368. As such, the wire mesh 250 may be omitted due to the static pressure of the second embodiment 400 being increased due to enhanced combustion of the injection from the central opening 368.

Figure 5:
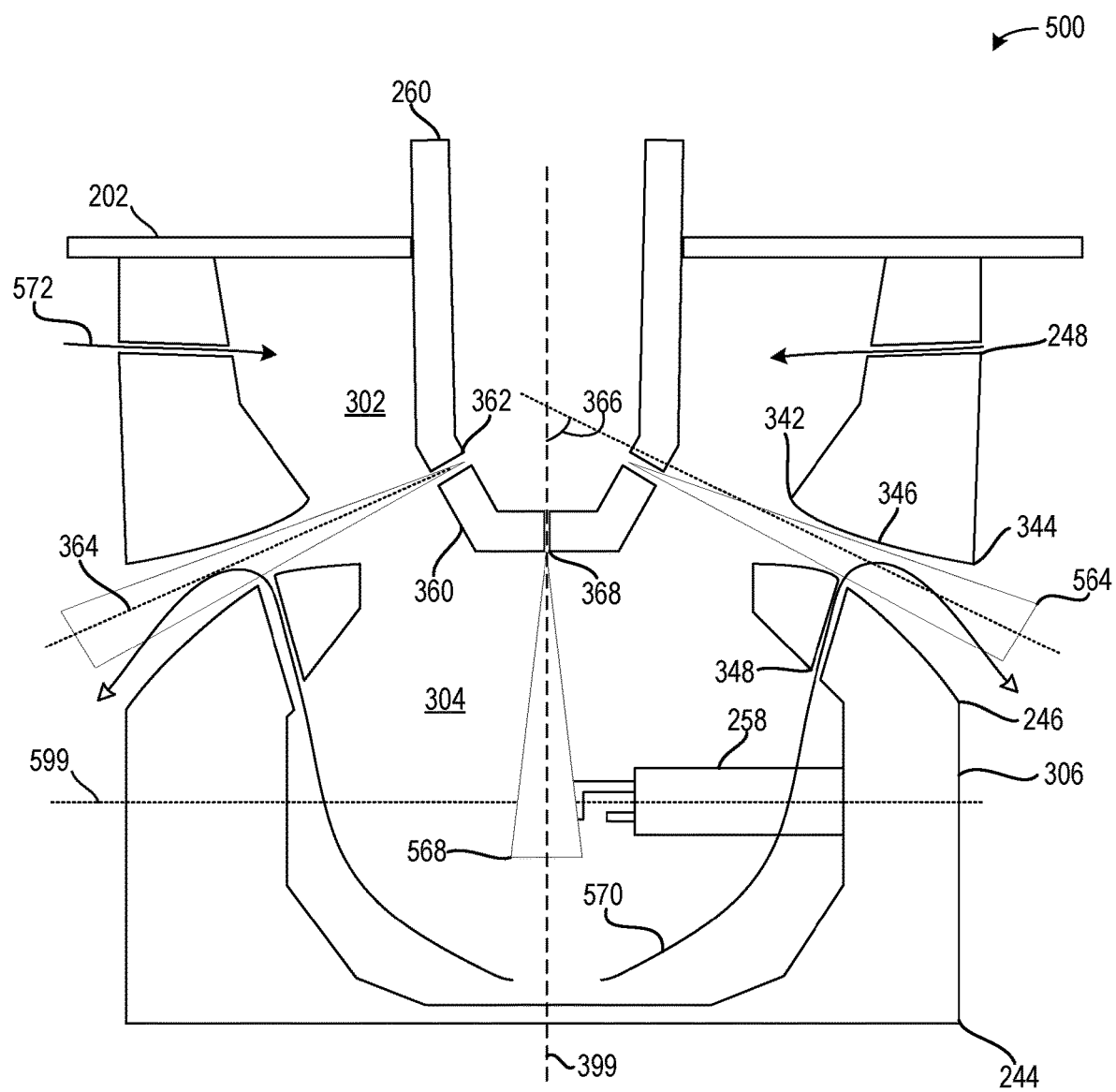
FIG. 5 illustrates a third example of the pre-chamber with an example fuel injection occurring therein.
Figure 6:
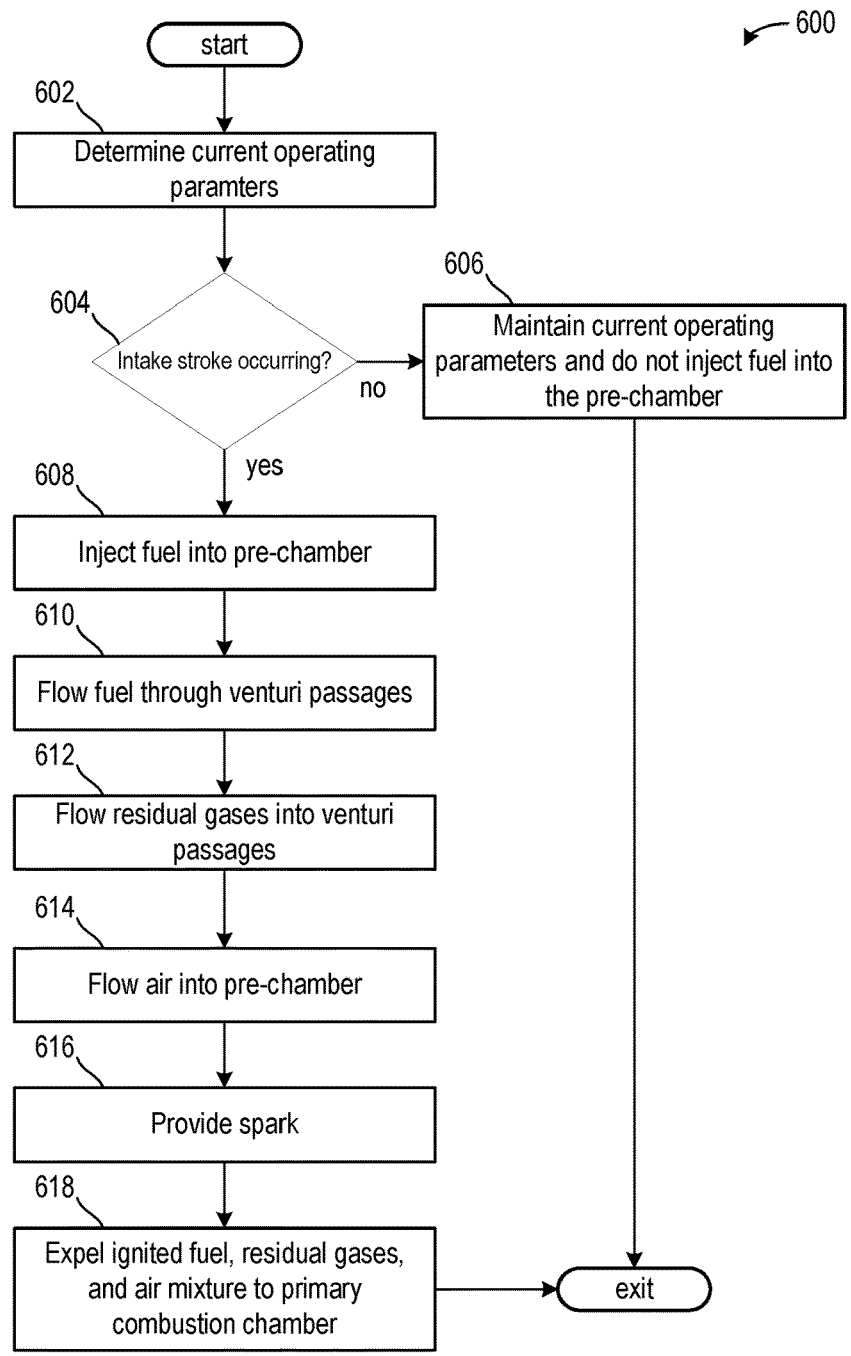
FIG. 6 illustrates a method for timing a fuel injection and flowing gases into and out of the pre-chamber.

Turning now to FIG. 5, it shows a third embodiment 500 of the pre-chamber 244 along with an example fuel injection flow, air flow, and residual gas flow. The third embodiment 500 may differ from the first embodiment 300 and the second embodiment 400 in that the ignition device 258 may be positioned completely below the cylinder head 202. In the example of FIG. 5, the ignition device 258 is positioned completely within the bottom half volume 304, wherein a central axis 599 of the ignition device 258 is normal to the central axis 399. Similar to the embodiment 400 of FIG. 4, the central opening 368 of the third embodiment 500 may comprise a reduced diameter relative to the central opening 368 of the first embodiment 300. As such, the central opening 368 may eject only enough fuel to at least partially fill the bottom half volume 304 without having the fuel impinge onto a bottom surface of the pre-chamber 244.

In one example, the fuel injector 260 may be signaled to inject fuel directly into the pre-chamber via the plurality of openings 362 and the central opening 368 in response to an intake stroke of a piston positioned in a primary combustion chamber. As such, fuel injections 564 flow through the plurality of openings 362 along the injection axes 364 toward the plurality of venturi passages 246. Furthermore, a central fuel injection 568 may exit the central opening 368 and flow into the bottom half volume 304. As the fuel injection 564 flow through the plurality of venturi passages 246, low-static pressure may be generated therein. Additionally, the central fuel injection 568 may increase a static pressure of the bottom half volume 304 and push residual gases 570 through the plurality of interior passages 348 and into the venturi passages 246. As such, the plurality of interior passages 348 are fluidly separated from the primary combustion chamber and only allow the residual gases 570 to exit with the fuel injections 564. Additionally, the central fuel injection 568, which is combusted, may exit the pre-chamber 244 via the venturi passages 246 by flowing thereto through the interior passages 348. As the fuel injections and residual gases exit the pre-chamber 244, air flow 572 may enter the pre-chamber 244 via the pre-chamber 244 from the plurality of air paths 248. The air may be supplied from the primary combustion chamber. In one example, the air flow 572 may be drawn through the venturi passages 246, wherein the air flow may mix with the fuel injections and residual gas before returning to the primary combustion chamber, where the pre-chamber mixture of fuel, residual gases, and air may mix with fuel and air in the primary combustion chamber. The pre-chamber mixture, which is ignited via the ignition device, may ignite the fuel/air mixture in the primary combustion chamber. By using the pre-chamber mixture to ignite the fuel/air mixture of the primary combustion chamber, the combustion may be more evenly distributed, resulting in enhanced power output and reduced emissions.

FIGS. 1-5 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. It will be appreciated that one or more components referred to as being "substantially similar and/or identical" differ from one another according to manufacturing tolerances (e.g., within 1-5% deviation).

Turning now to FIG. 6, it shows a method 600 for injecting fuel into the pre-chamber and flowing air and gases in the pre-chamber to the primary combustion chamber. Instructions for carrying out at least part of method 600 may be executed by a controller based on instructions stored on a memory of the controller and in conjunction with signals received from sensors of the engine system, such as the sensors described above with reference to FIG. 1. The controller may employ engine actuators of the engine system to adjust engine operation, according to the methods described below.

The method 600 begins at 602 which includes determining, estimating, and/or measuring one or more engine operating parameters. The one or more engine operating parameters may include a throttle position, a manifold vacuum, an engine temperature, an engine speed, a vehicle speed, and an air/fuel ratio.

The method 600 proceeds to 604, which includes determining if an intake stroke is occurring. The intake stroke may be occurring if a piston of the primary combustion chamber is moving from a top-dead center position to a bottom-dead center position. As such, the piston may be moving away from a cylinder head and increasing a volume of the primary combustion chamber.

If the intake stroke is not occurring, then the method 600 proceeds to 606, which includes maintaining current operating parameters. Furthermore, a fuel injection in the pre-chamber may not occur. As such, fuel is not expelled from the pre-chamber to the primary combustion chamber.

If the intake stroke is occurring, then the method 600 proceeds to 608, which includes injecting fuel into the pre-chamber. In one example, the controller signals to the fuel injector positioned to inject directly into the pre-chamber to begin injecting fuel. The fuel may be injected via the plurality of openings and the central opening.

The method 600 proceeds to 610, which includes flowing the fuel from the plurality of openings through the venturi passages. As such, low static pressure may be generated within the venturi passages as the fuel flows therethrough.

The method 600 proceeds to 612, which includes flowing the residual gases into the venturi passages. The combination of the low-static pressure in the venturi passages and high static pressure generated via the wire mesh and/or central injection may force the residual gases through the interior passages fluidly coupled to the venturi throat of the venturi passages The method 600 proceeds to 614, which includes flowing air in the pre-chamber via the plurality of air paths. As the fuel and residual gas mixture exits the venturi passages, the air may flow into the pre-chamber and mix with the remaining fuel and residual gases.

The method 600 proceeds to 616, which includes providing a spark via an ignition device. As such, air, fuel, and residual gases in the pre-chamber may be ignited.

The method 600 proceeds to 618, which includes expelling the mixture of ignited fuel, residual gases, and air to the primary combustion chamber. The mixture may penetrate deep into the primary combustion chamber such that combustion is more uniformly distributed through the primary combustion chamber relative to previous examples.

In this way, a pre-chamber may be configured to receive a plurality of fuel injections therein, wherein the fuel injections adjust static pressure of various portions of the pre-chamber to force residual gases from a previous combustion cycle out in a current combustion cycle. The technical effect of configuring the pre-chamber with venturi outlet passages and a wire mesh and/or deep penetrating ignition device is to adjust the static pressure to promote residual gas flow out of the bottom half volume of the pre-chamber and into the venturi throat of the venturi outlet passages. By doing this, an extra pump and/or passage may be omitted, resulting in reduced packaging constraints while still expelling the residual gases, resulting in increased air/fuel accuracy and increased power output. Additionally, incidence of misfire may be reduced and operation during low-load may be enhanced.

An example of a system comprises a pre-chamber configured to eject a mixture to a primary combustion chamber via a plurality of venturi passages.

A first example of the system further includes where the mixture comprises one or more of fuel, residual gases, and air.

A second example of the system, optionally including the first example, further includes where residual gases are forced from a bottom half volume of the pre-chamber to a venturi throat of a venturi passage of the plurality of venturi passages.

A third example of the system, optionally including one or more of the previous examples, further includes where the pre-chamber further comprises a plurality of air paths arranged between the plurality of venturi passages and a cylinder head, wherein the plurality of air paths is configured to flow air into the pre-chamber as residual gases enter the venturi throat.

A fourth example of the system, optionally including one or more of the previous examples, further includes where an entirety of the pre-chamber is arranged below a cylinder head and within a volume of the primary combustion chamber.

A fifth example of the system, optionally including one or more of the previous examples, further includes where a fuel injector is positioned to inject directly into a volume of the pre-chamber, wherein the fuel injector comprises a plurality of openings configured to inject a plurality of fuel injections directly into the plurality of venturi passages.

A sixth example of the system, optionally including one or more of the previous examples, further includes where the fuel injector further comprises a central opening configured to inject a central fuel injection towards a bottom half volume of the pre-chamber, wherein the central fuel injection impinges onto a wire mesh.

A seventh example of the system, optionally including one or more of the previous examples, further includes where an ignition device extends into the bottom half volume of the pre-chamber, and wherein a central axis of the ignition device is angled to or parallel to a central axis of the fuel injector.

An eighth example of the system, optionally including one or more of the previous examples, further includes where the ignition device is arranged between adjacent openings of the plurality of openings.

An example of an engine comprises a primary combustion chamber comprising a volume defined by a cylinder head, interior cylinder walls, and a piston upper surface, a pre-chamber arranged within the volume and coupled to the cylinder head, wherein a pre-chamber volume is separated from the volume via pre-chamber walls, wherein the pre-chamber volume is fluidly coupled to the volume via a plurality of venturi passages and a plurality of air paths, and a fuel injector positioned to inject directly into the pre-chamber volume and a spark plug positioned to provide spark within the pre-chamber volume.

A first example of the engine optionally includes where the fuel injector comprises a plurality of openings configured to inject fuel at an angle relative to a central axis of the fuel injector, wherein the plurality of openings direct fuel directly to the plurality of venturi passages, wherein the fuel injector is the only injector and the primary combustion chamber is free of a different fuel injector.

A second example of the engine, optionally including the first example, further includes where each of the plurality of venturi passages comprises a venturi inlet, a venturi outlet, and a venturi throat arranged therebetween, wherein the venturi throat comprises a smaller cross-sectional flow-through area than the venturi inlet and the venturi outlet, further comprises where a plurality of interior passages fluidly couple a bottom half volume of the pre-chamber to the venturi throat.

A third example of the engine, optionally including one or more of the previous examples, further includes where the fuel injector comprises a central opening configured to direct a central fuel injection to a wire mesh, wherein the central fuel injection impinges onto the wire mesh and does not enter the primary combustion chamber.

A fourth example of the engine, optionally including one or more of the previous examples, further includes where the spark plug is positioned at an angle relative to a central axis of the fuel injector.

A fifth example of the engine, optionally including one or more of the previous examples, further includes where the angle is normal to the central axis.

A sixth example of the engine, optionally including one or more of the previous examples, further includes where the plurality of air paths is arranged between the cylinder head and the plurality of venturi passages.

An embodiment of a system of an engine comprises a primary combustion chamber comprising a piston configured to oscillate therein, a pre-chamber comprising a fuel injector positioned to inject fuel directly therein, e pre-chamber further comprising a spark plug positioned to provide a spark directly therein, wherein the pre-chamber is arranged below a cylinder head within a volume of the primary combustion chamber, wherein a plurality of venturi passages fluidly couple the pre-chamber to the volume of the primary combustion chamber, wherein each of the plurality of venturi passages comprises a venturi throat coupled to an interior passage of a plurality of interior passages, wherein the interior passage fluidly couples the venturi throat to a bottom half volume of the pre-chamber.

A first example of the system further includes where the piston is configured to adjust a volume of only the primary combustion chamber.

A second example of the system, optionally including the first example, further includes where the fuel injector comprises a plurality of openings configured to inject into a top half volume of the pre-chamber, wherein an injection axis of an injection expelled from one of the plurality of openings is angled relative to a central axis of the fuel injector and configured to direct the fuel injection directly to one of the plurality of venturi passages.

A third example of the system, optionally including one or more of the previous examples, further includes where the spark plug is arranged parallel or angled to the central axis of the fuel injector, wherein the spark plug is positioned to ignite a central injection expelled from a central opening of the fuel injector, wherein an injection axis of the central injection is parallel to the central axis of the fuel injector.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system comprising:
a pre-chamber configured to eject a mixture to a primary combustion chamber via a plurality of venturi passages, the pre-chamber further comprising a plurality of air paths arranged above a plurality of openings of a fuel injector relative to a central axis of the pre-chamber.

2. The system of claim 1, wherein the mixture comprises one or more of fuel, residual gases, and air.

3. The system of claim 1, wherein residual gases are forced from a bottom half volume of the pre-chamber to a venturi throat of a venturi passage of the plurality of venturi passages or through the plurality of air paths to a top half volume.

4. The system of claim 3, wherein the plurality of air paths is arranged between the plurality of venturi passages and a cylinder head, wherein the plurality of air paths is configured to flow air into the pre-chamber as residual gases enter the venturi throat.

5. The system of claim 3, wherein an entirety of the pre-chamber is arranged below a cylinder head and within a volume of the primary combustion chamber.

6. The system of claim 1, wherein the fuel injector is positioned to inject directly into a volume of the pre-chamber, wherein the plurality of openings is configured to inject a plurality of fuel injections directly into the plurality of venturi passages.

7. The system of claim 6, wherein the fuel injector further comprises a central opening configured to inject a central fuel injection towards a bottom half volume of the pre-chamber parallel to the central axis, wherein the central fuel injection impinges onto a wire mesh.

8. The system of claim 7, wherein an ignition device extends into the bottom half volume of the pre-chamber, and wherein a central axis of the ignition device is angled to or parallel to the central axis of the pre-chamber.

9. The system of claim 8, wherein the ignition device is arranged between adjacent openings of the plurality of openings.

10. An engine, comprising:
a primary combustion chamber comprising a volume defined by a cylinder head, interior cylinder walls, and a piston upper surface;
a pre-chamber arranged within the volume and coupled to the cylinder head, wherein a pre-chamber volume is separated from the volume via pre-chamber walls, wherein the pre-chamber volume is fluidly coupled directly to the volume via a plurality of venturi passages and a plurality of air paths; and
a fuel injector positioned to inject directly into the pre-chamber volume between the plurality of venturi passages and the plurality of air paths and a spark plug positioned to provide spark within the pre-chamber volume.

11. The engine of claim 10, wherein the fuel injector comprises a plurality of openings configured to inject fuel at an angle relative to a central axis of the fuel injector, wherein the plurality of openings direct fuel directly to the plurality of venturi passages, wherein the fuel injector is the only injector and the primary combustion chamber is free of a different fuel injector.

12. The engine of claim 10, wherein each of the plurality of venturi passages comprises a venturi inlet, a venturi outlet, and a venturi throat arranged therebetween, wherein the venturi throat comprises a smaller cross-sectional flow-through area than the venturi inlet and the venturi outlet, further comprises where a plurality of interior passages fluidly couple a bottom half volume of the pre-chamber to the venturi throat.

13. The engine of claim 10, wherein the fuel injector comprises a central opening configured to direct a central fuel injection to a wire mesh, wherein the central fuel injection impinges onto the wire mesh and does not enter the primary combustion chamber.

14. The engine of claim 10, wherein the spark plug is positioned at an angle relative to a central axis of the fuel injector.

15. The engine of claim 14, wherein the angle is normal to the central axis.

16. The engine of claim 14, wherein the plurality of air paths is arranged between the cylinder head and the plurality of venturi passages.

17. A system of an engine, comprising:
a primary combustion chamber comprising a piston configured to oscillate therein;
a pre-chamber comprising a fuel injector positioned to inject fuel directly therein, the pre-chamber further comprising a spark plug positioned to provide a spark directly therein, wherein the pre-chamber is arranged below a cylinder head within a volume of the primary combustion chamber;
wherein a plurality of venturi passages fluidly couple the pre-chamber to the volume of the primary combustion chamber, wherein each of the plurality of venturi passages comprises a venturi throat coupled to an interior passage of a plurality of interior passages, wherein the interior passage fluidly couples the venturi throat to a bottom half volume of the pre-chamber, further comprising a plurality of air paths arranged between an injection point of the fuel injector and the cylinder head.

18. The system of the engine of claim 17, wherein the piston is configured to adjust the volume of only the primary combustion chamber.

19. The system of the engine of claim 17, wherein the fuel injector comprises a plurality of openings configured to inject into a top half volume of the pre-chamber, wherein an injection axis of an injection expelled from one of the plurality of openings is angled relative to a central axis of the fuel injector and configured to direct a fuel injection directly to one of the plurality of venturi passages.

20. The system of the engine of claim 19, wherein the spark plug is arranged parallel or angled to the central axis of the fuel injector, wherein the spark plug is positioned to ignite a central injection expelled from a central opening of the fuel injector, wherein the injection axis of the central injection is parallel to the central axis of the fuel injector.

* * * * *